United States Patent [19]

Åbom

[11] Patent Number: 4,610,136
[45] Date of Patent: Sep. 9, 1986

[54] DEVICE FOR IGNITION OF THE POWDER IN POWDER ENGINES AND POWDER-OPERATED TURBINE ENGINES

[76] Inventor: Jan J. V. Åbom, 12 Poppelgatan, S-421 74 Västra Frölunda, Sweden

[21] Appl. No.: 687,490

[22] Filed: Dec. 28, 1984

Related U.S. Application Data

[63] Continuation of Ser. No. 488,078, Apr. 25, 1983, abandoned.

[30] Foreign Application Priority Data

May 6, 1982 [SE] Sweden ................................ 8202835

[51] Int. Cl.$^4$ ............................................. F02C 3/26
[52] U.S. Cl. .................................... 60/39.464; 123/23; 110/104 B; 110/106
[58] Field of Search ............ 60/39.464; 123/23, 24 R; 110/102, 104 R, 104 B, 105, 106, 347

[56] References Cited

U.S. PATENT DOCUMENTS

| 641,497 | 1/1900 | Campbell et al. | 110/104 R |
| 987,834 | 3/1911 | Selden | 110/104 R |
| 1,504,528 | 8/1924 | Strandrud | 110/102 |
| 1,518,223 | 12/1924 | Schott et al. | 110/104 B |
| 1,532,041 | 3/1925 | Couch | 110/104 R |
| 1,647,675 | 11/1927 | Vedder | 110/104 B |
| 1,705,383 | 3/1929 | Weiss | 60/39.464 X |
| 1,838,521 | 12/1931 | Arrowood | 110/104 R |
| 2,509,246 | 5/1950 | Ramsey | 60/39.464 X |
| 3,271,951 | 9/1966 | Nettel | 60/39.464 X |
| 4,059,415 | 11/1977 | Kosaka et al. | 60/39.464 X |
| 4,152,890 | 5/1979 | Weiland | 60/39.464 X |

FOREIGN PATENT DOCUMENTS

| 156841 | 9/1982 | German Democratic Rep. | 110/106 |

*Primary Examiner*—Louis J. Casaregola
*Assistant Examiner*—Donald E. Stout
*Attorney, Agent, or Firm*—Shapiro and Shapiro

[57] ABSTRACT

A device for ignition of the powder in powder engines and powder-operated turbine engines comprises heated divergent slots through which the powder is disposed to be blown.

8 Claims, 6 Drawing Figures

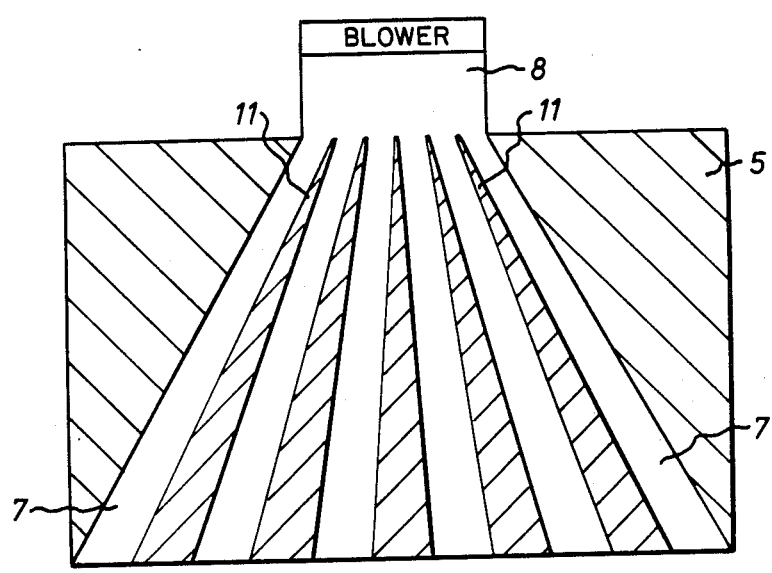

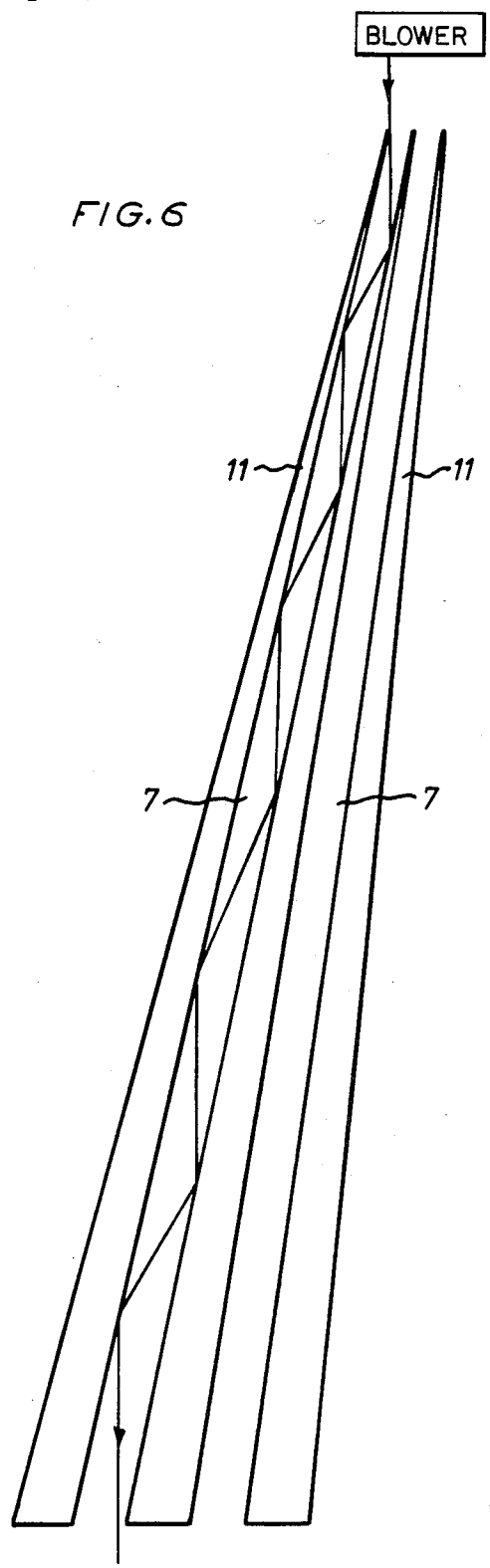

DEVICE FOR IGNITION OF THE POWDER IN POWDER ENGINES AND POWDER-OPERATED TURBINE ENGINES

This is a continuation application of Ser. No 488,078, filed Apr. 25, 1983, now abandoned.

The fuel injection mechanism according to Swedish Patent Specification 386,955 permits injecting fast engines, operating at a speed of up to 6000 rpm, with pulverulent fuels of e.g. wood, peat and the like. The ignition delay of pulverulent fuels is much higher than the coresponding delay of the motor fuels used today, i.e. petrol and diesel oil. In a diesel engine for oil provided with an antechamber the time delay is 0.0006 seconds, which corresponds to about 5 crank angle degrees at 2000 rpm.

The average wall temperature in the antechamber in an oil diesel engine must not exceed 750° C. since a higher temperature would give dissociation of the fuel with a risk of coke coatings in the engine.

In powder engines the fuel must be ignited at a temperature considerably exceeding the temperature of the combustion air at the upper dead point. At $\epsilon=10$ the temperature is 450° C., Otto engine, and at $\epsilon=20$ the temperature is 650° C., diesel engine, at an intake temperature of 50° C.

The present invention is directed to a device for ignition of the powder in powder engines and powder-operated turbine engines, which device gives an extraordinarily fast ignition. Characteristic of the device is that it comprises heated divergent slots through which the powder is adapted to be blown.

The invention will be described more fully with reference to the accompanying drawings illustrating by way of example a device combined wih a combustion chamber in a powder engine. In the drawings:

FIGS. 2–5 are cross-sectional views on line II—II, III—III, IV—IV and V—V in FIG. 1; and FIG. 6 shows some slots on an enlarged scale wherein the path of the powder particles is indicated.

Figure 1:
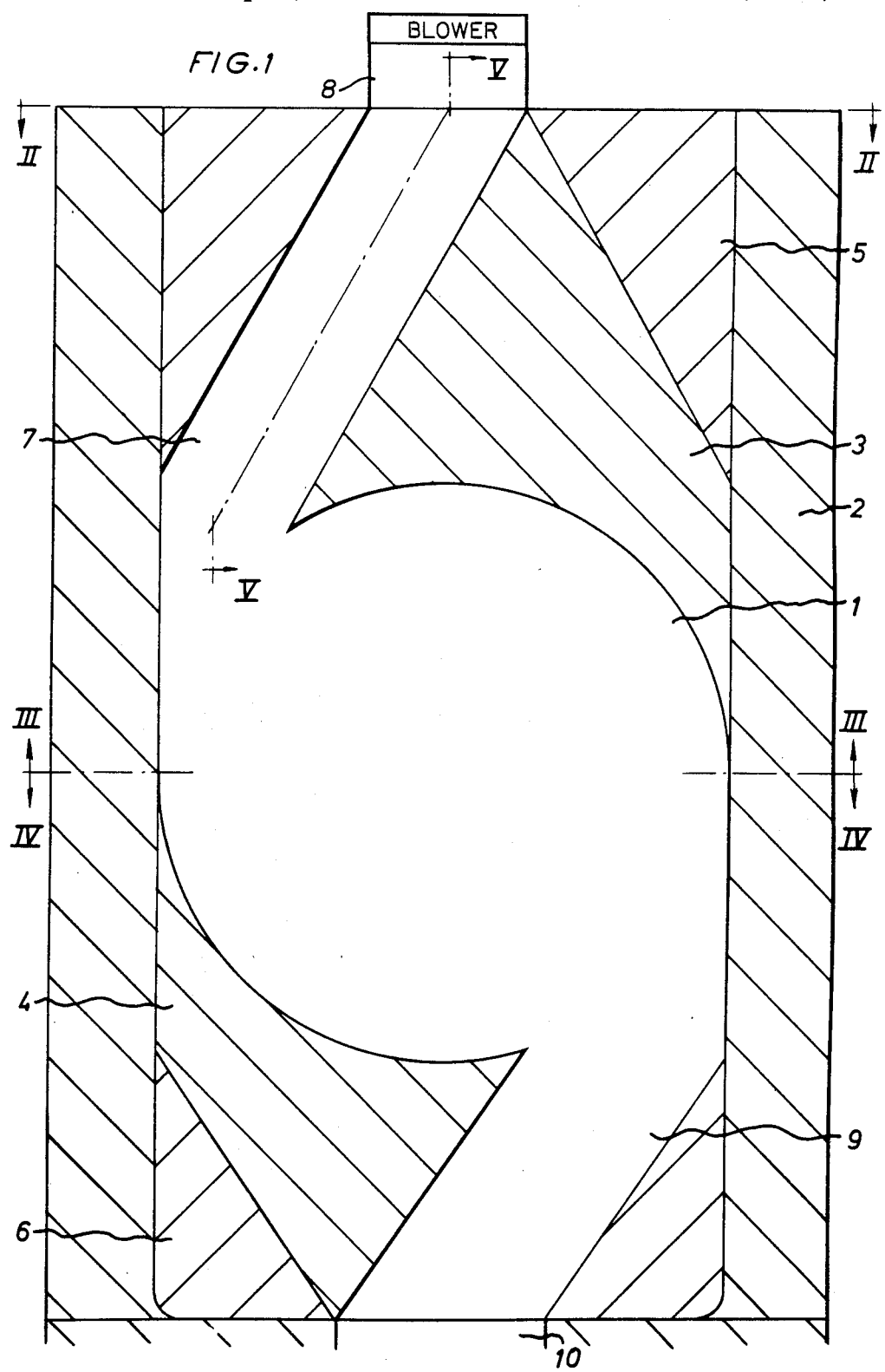
FIG. 1 shows a longitudinal section through said device.
Figure 3:
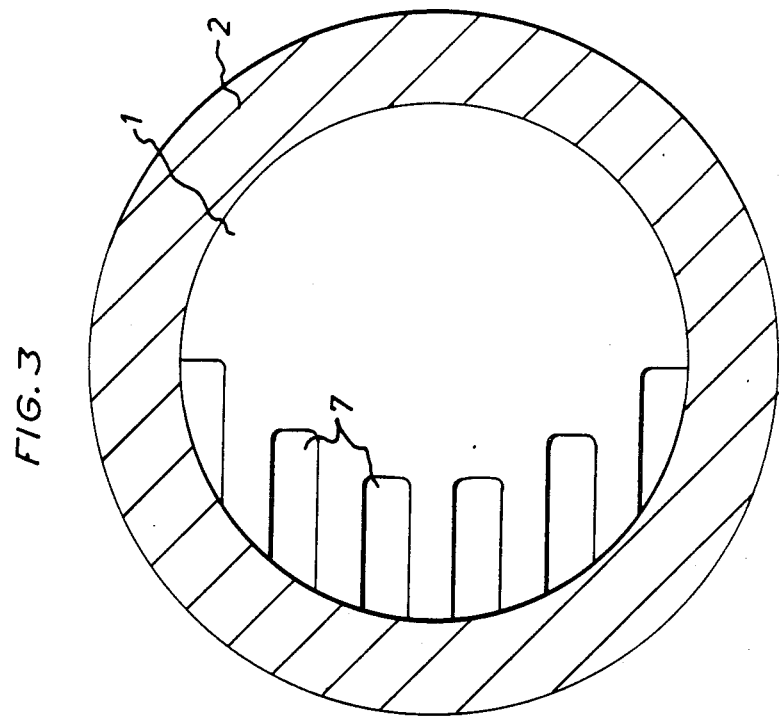
Figure 2:
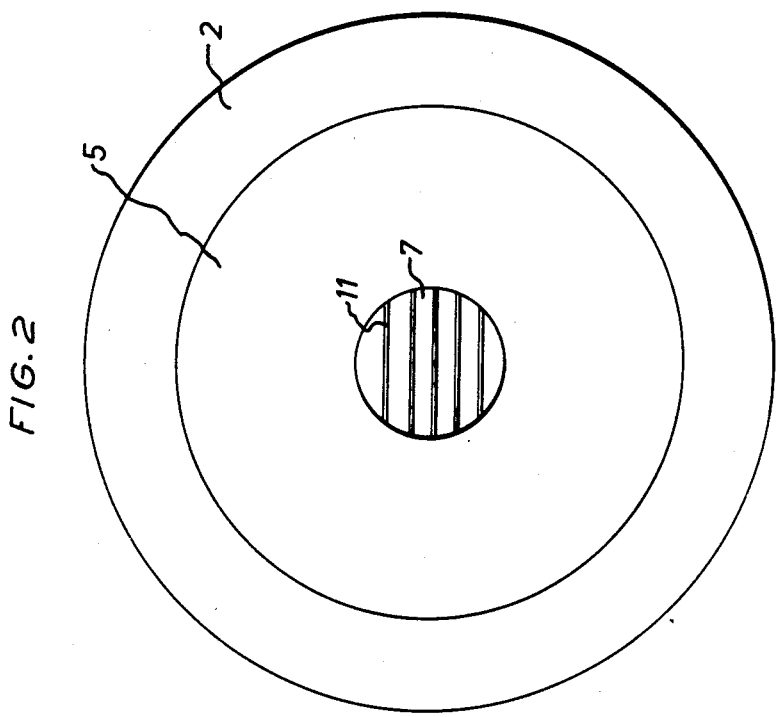
Figure 4:
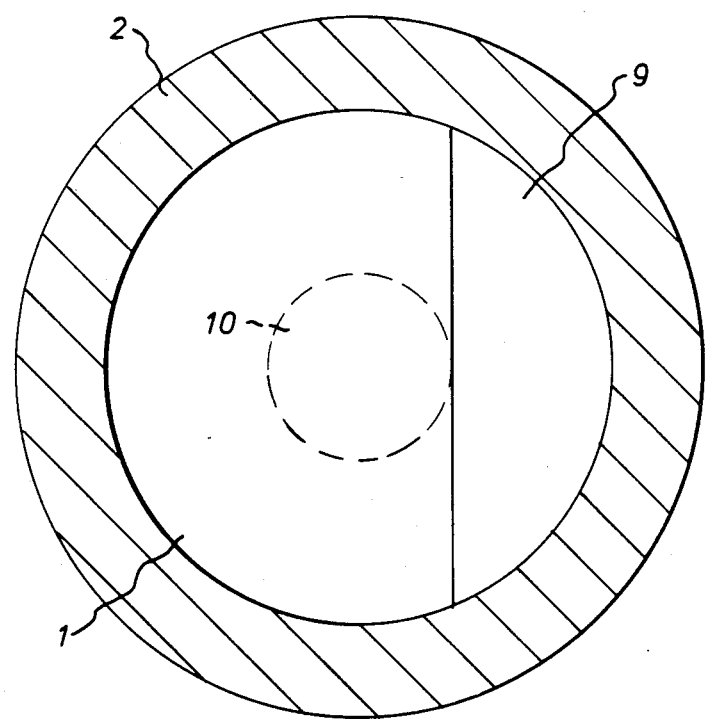

The combination chamber, designated 1, is provided in a pressure-absorbing pipe 2. The combustion chamber 1 is defined upwardly by a conical ignition slot section 3 and downwardly by a conical outlet section 4. The section 3 cooperates with a sleeve 5 while the section 4 cooperates with a sleeve 6. The inlet section of the ignition slots 7 is situated in the centre of the sleeve 5 while the outlet section of the ignition slots 7 in the combustion chamber 1 is situated adjacent the pressure-absorbing pipe 2.

The powder inlet passage 8, which is parallel with the pressure-absorbing pipe 2, opens straight in front of the inlet section of the ignition slots 7. The conical outlet section 4 is provided with a passage 9 merging in a central passage 10 to the engine cylinder. The passage 9, like the ignition slots 7, is inclined relative to the pipe 2 and starts from the side opposite that side on which the ignition slots 7 open into the combustion chamber 1 which is substantially spherical.

The temperature in the conbustion chamber 1 and the ignition slots 7 is controlled by a temperature sensing means in a temperature pocket preferably situated immediately below the sleeve 6 adjacent the passage 10. Heat is supplied through the pressure-absorbing pipe 2 and the sleeve 5 to the ignition slots 7 through an electric coil, a gas burner or the like upon start of the engine. At maximum engine power heat is supplied to the ignition slots 7 substantially from the combustion chamber 1.

The ignition slots 7 heated in the manner indicated above diverge as counted from the powder inlet. The powder is blown from the inlet passage 8 through the ignition slots 7 into the combustion chamber 1. To this effect the diverging ignition slots 7 are oriented so as to be inclined relative to the blowing (flow) direction of powder blown from inlet passage 8.

As is apparent from the drawings the ingition slots 7 are separated by walls 11 which have sharp edges at the inlet end of slots 7 to counteract clogging. These walls 11 have a thickness increasing in along the length of slots 7 from inlet passage 8. The ignition slots 7 shown in FIG. 6 are according to scale. In the representative embodiment thus illustrated the ignition slots 7 are long and narrow, the width of the slots 7 on the inlet side being approximately half the width of the slots 7 on the outlet side. The length is about 25–50 times greater than the width of the slots 7.

According to the embodiment shown the slots 7 are situated between two plane surfaces but alternatively the slots 7 may be defined by curved or angled surfaces. According to a preferred embodiment the slots are circular and positioned between concentrically arranged conical sleeves which preferably are provided with sharp edges corresponding to the edges 11 in the embodiment shown. The angled surfaces may be star-shaped.

When poplar wood is used the ignition slots 7 are dimensioned in the following way. It is assumed that poplar wood can be comminuted to form a powder of a normal particle size distribution of about 0.1 mm by means of modern high-speed mills with hard metal knives. By milling this powder in ball mills with e.g. $\phi$ 6 mm balls it is possible to produce a powder down to 0.005 mm.

In poplar powder normally divided about 0.070 mm the inlet width of the ignition slot 6 should be 0.5 mm, the height 9 mm, the outlet width 1 mm and the length 25 mm and the average temperature 960° C.

According to an interesting observation the temperature of the ignition slots 7 can be lowered to 760° C. if the poplar powder contains 10% sphagnum peat powder vacuum-dried at 165° C.

In tests carried out in this connection the material in the ignition slots 7 consisted of cobalt-nickel alloys. The alloy should suitably include about 0.5% yttrium. Ceramics, aluminum oxide and silicon nitride and compounds thereof are also suitable.

During operation of the engine the powder is blown into the ignition slots 7 at a pressure of 120–200 bar. As the compression pressure is only 40 bar (diesel) and the combustion pressure 75 bar the powder has a speed of about 400 m/s when entering the slots 7. The powder particles are thrown from one side of the slot 7 to the other, which appears from the powder particle path indicated in FIG. 6. The friction between slot wall and the radiation in the slot 7 ignites the particles in 0.00006 sec., which corresponds to 2 crank angle degrees at a 6000 rpm engine.

The slot arrangement according to the present invention may besides be used in all ignition of powder at low pressure, e.g. in powder-fired heating boilers.

The invention is not restricted to that described above and shown in the drawings but may be modified within the scope of the appended claims.

What I claim and desire to secure by Letters Patent is:

1. A device for ignition of powder in powder engines and power-operated turbine engines, comprising a powder inlet passage through which powder flows, wall means defining a plurality of elongated divergent ignition slots having their length inclined to the direction of powder flow in said inlet passage, means for heating said ignition slots to a temperature higher than the ignition temperature of the powder, and means for blowing powder through said inlet passage into said slots and forcing particles of said powder to impact repeatedly upon said wall means with sufficient friction between the powder particles and said wall means at the temperature in said slots to cause said powder to ignite in said slots.

2. A device in accordance with claim 1, wherein said heating means comprises means for transferring heat from a combustion chamber to said slots.

3. A device in accordance with claim 1, wherein said means for blowing comprises means blowing powder including poplar wood particles of about 0.1 mm or less in size, and wherein said heating means heats said slots to a temperature of at least 760° C.

4. A device in accordance with claim 3, wherein said heating means heats said slots to an average temperature of 960° C.

5. A device in accordance with claim 1, wherein said wall means includes walls that separate said slots and that have sharp edges adjacent to the inlet passage.

6. A device in accordance with claim 5, wherein the walls have a thickness that increases along the length of the slots from said inlet passage.

7. A device in accordance with claim 1, wherein the width of the slots at the inlet end of the slots is about half the width of the slots at the outlet end of the slots.

8. A device in accordance with claim 7, wherein the slots have a length that is about 25-50 times greater than the width of the slots.

* * * * *